United States Patent
Oya (10) Patent No.: US 8,363,886 B2
(45) Date of Patent: Jan. 29, 2013

(54) IMAGE PROCESSING APPARATUS FOR PROVIDING METADATA TO CAPTURED IMAGE AND METHOD THEREOF

(75) Inventor: Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 12/492,048

(22) Filed: Jun. 25, 2009

(65) Prior Publication Data

US 2009/0324007 A1 Dec. 31, 2009

(30) Foreign Application Priority Data

Jun. 26, 2008 (JP) .................................. 2008-167893

(51) Int. Cl.
*G06K 9/00* (2006.01)
*G06K 9/54* (2006.01)
*G06K 9/60* (2006.01)

(52) U.S. Cl. ................ 382/100; 382/307; 707/E17.009; 707/999.102

(58) Field of Classification Search .................. 382/100, 382/307; 707/E17.009, 999.102
See application file for complete search history.

(56) References Cited

U.S. PATENT DOCUMENTS

| 7,528,868 | B2 * | 5/2009 | Perotti et al. ............... 348/231.3 |
| 7,676,118 | B2 * | 3/2010 | Liu et al. ........................ 382/306 |
| 7,738,015 | B2 * | 6/2010 | Steinberg et al. .......... 348/223.1 |
| 2003/0147563 | A1 * | 8/2003 | Liu et al. ........................ 382/276 |
| 2004/0008258 | A1 | 1/2004 | Aas |
| 2005/0018057 | A1 * | 1/2005 | Bronstein et al. ............. 348/239 |
| 2006/0285754 | A1 * | 12/2006 | Steinberg et al. ............. 382/224 |
| 2008/0136834 | A1 * | 6/2008 | Zhang et al. .................. 345/589 |

FOREIGN PATENT DOCUMENTS

| JP | 2004-062868 | 2/2004 |
| JP | 2005-039354 | 2/2005 |
| JP | 2006-165822 | 6/2006 |
| JP | 2008-148220 A | 6/2008 |

* cited by examiner

*Primary Examiner* — Aaron W Carter
(74) *Attorney, Agent, or Firm* — Canon USA Inc. IP Division (57) ABSTRACT

An image processing apparatus acquires data of a finder image in an imaging apparatus, analyzes the data of the finder image, and extracts a feature amount of the finder image. Then, the image processing apparatus generates metadata based on the analysis result, and provides the metadata to a still image data captured by the imaging apparatus.

15 Claims, 8 Drawing Sheets

```xml
<?xml version="1.0" encoding="UTF-16"?>
<metadata>
<content_description>
 <scene>
   <relative_time>-2.66</rerative_time>
   <scene_time>night</scene_time>
   <scene_plaec>town</scene_place>
 </scene>
 <person>
   <relative_time>-2.66</rerative_time>
   <attribute>
     <person_id>123456</person_id>
     <person_name>
       <name_comp type="given"TARO</name_comp> >
       <name_comp type="family"KIYANO </name_comp> >
     </person_name>
   </attribute>
   <face>
     <area_comp type="top">237</area_comp>
     <area_comp type="left">162</area_comp>
     <area_comp type="width">107</area_comp>
     <area_comp type="height">126</area_comp>
     <face_image>
       (JPEG-IMAGE...)
     </face_image>
   </face>
 </person>
 <text>
   <relative_time>-2.66</rerative_time>
   <text_shop>○○BANK </text_shop>
 </text>
 <text>
   <relative_time>-8.16</rerative_time>
   <text_shop>○○STATION</text_shop>
 </text>
</content_description>
</metadata>
```

FIG. 7

IMAGE PROCESSING APPARATUS FOR PROVIDING METADATA TO CAPTURED IMAGE AND METHOD THEREOF

BACKGROUND OF THE INVENTION

1. Field of the Invention

The present invention relates to an image processing apparatus and an image processing method suitable for processing image data acquired by a digital camera or other apparatuses.

2. Description of the Related Art

A technique for analyzing a subject and an event of an image and automatically generating metadata has been known. In such an automatic generation technique, metadata that is extracted from an image is generally provided to the image of an extraction origin. For example, in the case of a digital camera, metadata that is extracted from a captured still image is generally stored in a header portion of the corresponding image.

Japanese Patent Application Laid-Open No. 2004-062868 discusses a camera that recognizes a figure (person) of a captured image in corporation with an external database and provides metadata to an image. Further, Japanese Patent Application Laid-Open No. 2005-039354 discusses a camera that extracts character information from a recorded image and provides the extracted character information thereto as metadata. Furthermore, Japanese Patent Application Laid-Open No. 2006-165822 discusses an electronic camera that overlaps related information on a captured image and displays the captured image, when a previously registered subject figure (person) exists in the captured image.

However, the metadata that is provided only according to the technique in the conventional art may not be usable for various applications. For example, metadata available at the time of viewing a captured image may not be provided.

SUMMARY OF THE INVENTION

The present invention is directed to an image processing apparatus and an image processing method that can provide a wide range of metadata to captured image data.

According to an aspect of the present invention, an image processing apparatus includes a confirming-image data acquiring unit configured to acquire image data to be used for confirming an image to be captured from an imaging unit, an image analysis unit configured to analyze the confirming-image data, a metadata generation unit configured to generate metadata based on the analysis result by the image analysis unit, and a metadata providing unit configured to provide the metadata to the data of the image captured by the imaging unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
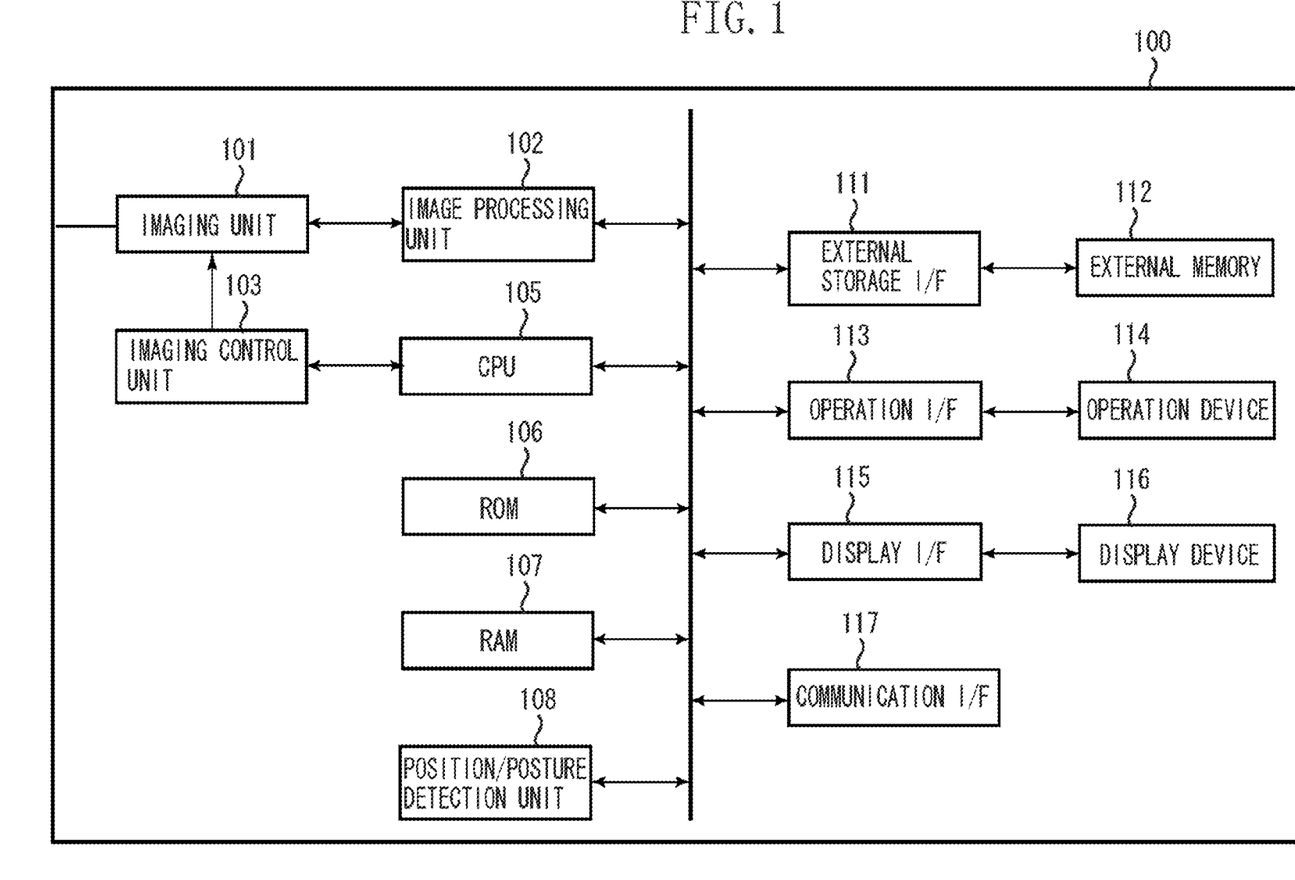
FIG. 1 illustrates a camera according to a first exemplary embodiment.

First, a first exemplary embodiment will be described. In the first exemplary embodiment, a camera functions as an image processing apparatus. FIG. 1 illustrates a camera according to the first exemplary embodiment of the present invention.

A camera (imaging apparatus) 100 according to the first exemplary embodiment includes an imaging unit 101, an image processing unit 102, a imaging control unit 103, a central processing unit (CPU) 105, a read only memory (ROM) 106, a random access memory (RAM) 107, and a position/posture detection unit 108. That is, the whole imaging system for capturing an image is incorporated in the image processing apparatus.

The ROM 106 stores a program that is executed by the CPU 105. This program includes a program that is used for providing metadata to still image data. Further, the camera 100 is provided with an external storage interface (I/F) 111, and an external memory (recording medium) 112, such as a memory card, is mounted in the external storage I/F 111.

Further, the camera 100 is provided with an operation device interface (I/F) 113, and an operation device 114, such as a button and a switch, is provided in the operation device I/F 113.

The operation device 114 is used when a user controls the operation of the camera 100. Further, the camera 100 is provided with a display device interface (I/F) 115, and a display device 116, such as a liquid crystal display device or an organic electro-luminescence (EL) display device, is connected to the display device I/F 115.

Further, the camera 100 is provided with a communication interface (I/F) 117 for communicating with external apparatuses. Examples of the communication I/F 117 may include a universal serial bus (USB) interface and a local area network (LAN) interface. However, the present invention is not limited thereto, and other interfaces may be used. That is, a communication method is not limited in particular.

Further, the camera 100 includes a plurality of operation modes such as a still image capturing mode, a moving picture capturing mode, a reproduction mode, and a PC control mode. The operation modes are selected by the user operation via the operation device 114.

The imaging unit 101 is provided with an optical system and an imaging sensor (not illustrated), and the imaging control unit 103 controls focusing, zooming, diaphragm, shutter speed, and sensitivity. In addition, the image processing unit 102 executes a noise removing process, a developing process, and an encoding process with respect to image data of a subject image input from the imaging unit 101.

After the image processing, the image data is appropriately stored in the RAM 107, the external memory 112 or a video memory (not illustrated) as finder-image data or still image data, based on an instruction from the CPU 105.

Further, the finder-image data is small-size image data for confirming the image to be captured (imaging confirming image), but the still image data is captured according to a release request. The finder-image data has resolution of about quarter VGA (QVGA) (320×200 pixels).

Figure 2:
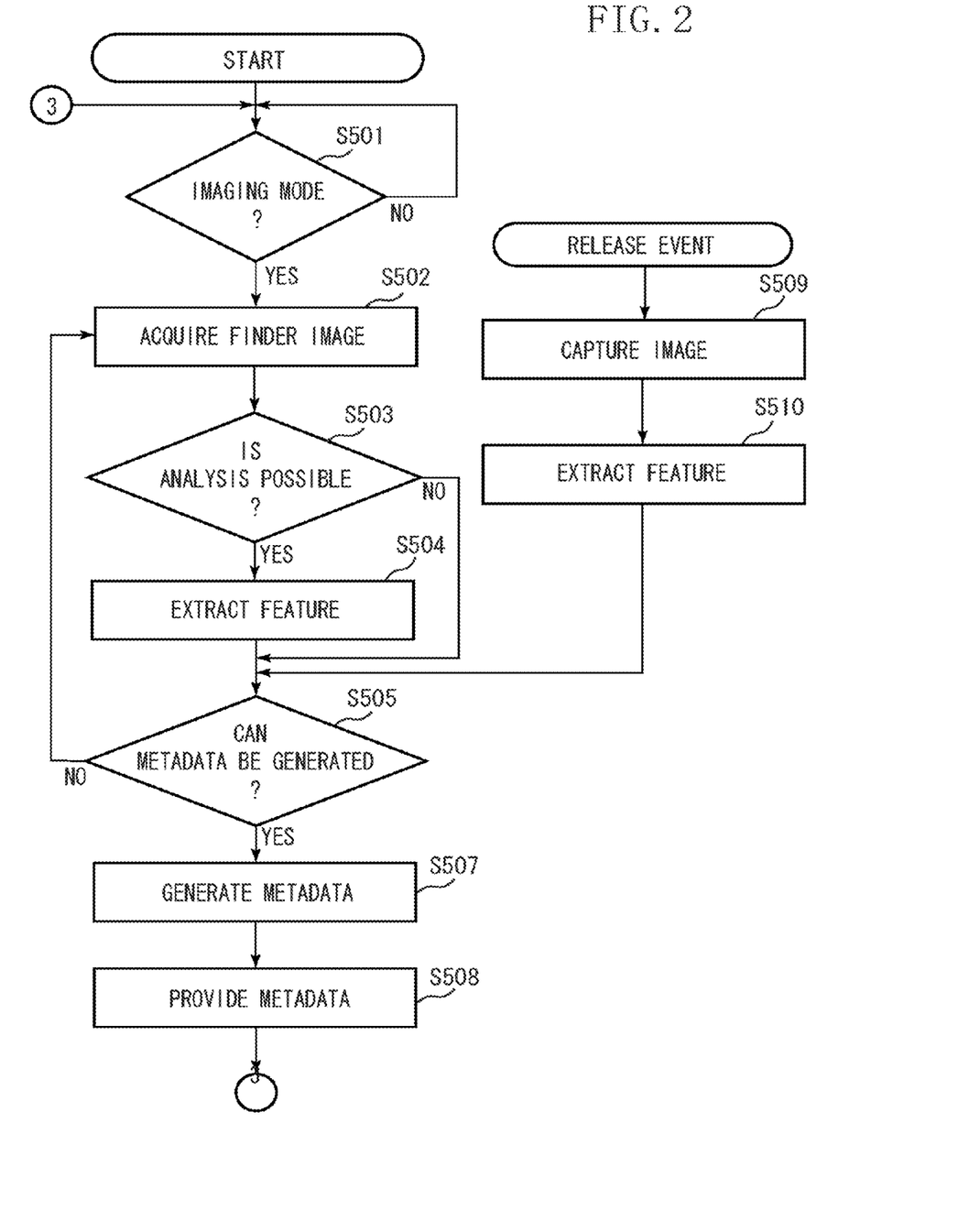
FIG. 2 is a flowchart illustrating a processing sequence when metadata is provided.

Next, the operation of the camera 100 will be described according to the program for providing the metadata to the image data. FIG. 2 is a flowchart illustrating the operation (processing sequence for providing metadata) of a camera 100.

First, the CPU 105 determines whether an operation mode is set to a still image capturing mode in step S501. If the operation mode is set to the still image capturing mode (YES in step S501), then in step S502, the CPU 105 obtains finder-image data functioning as an imaging-confirmation-image data acquiring unit to acquire finder-image data. Then, the CPU 105 stores the finder-image data in the RAM 107 or the video memory and displays the finder-image data on the display device 116.

Next, in step S503, the CPU 105 determines whether the acquired finder-image-data can be analyzed. This is because a feature amount of an image may not be able to be extracted due to camera shaking or image blurring.

If the acquired finder-image data can be analyzed (YES in step S503), in step S504, the CPU 105 analyzes the finder-image data by functioning as the image analysis unit, to extract the feature amount of the finder image, and then stores the feature amount in the RAM 107.

Figure 3:
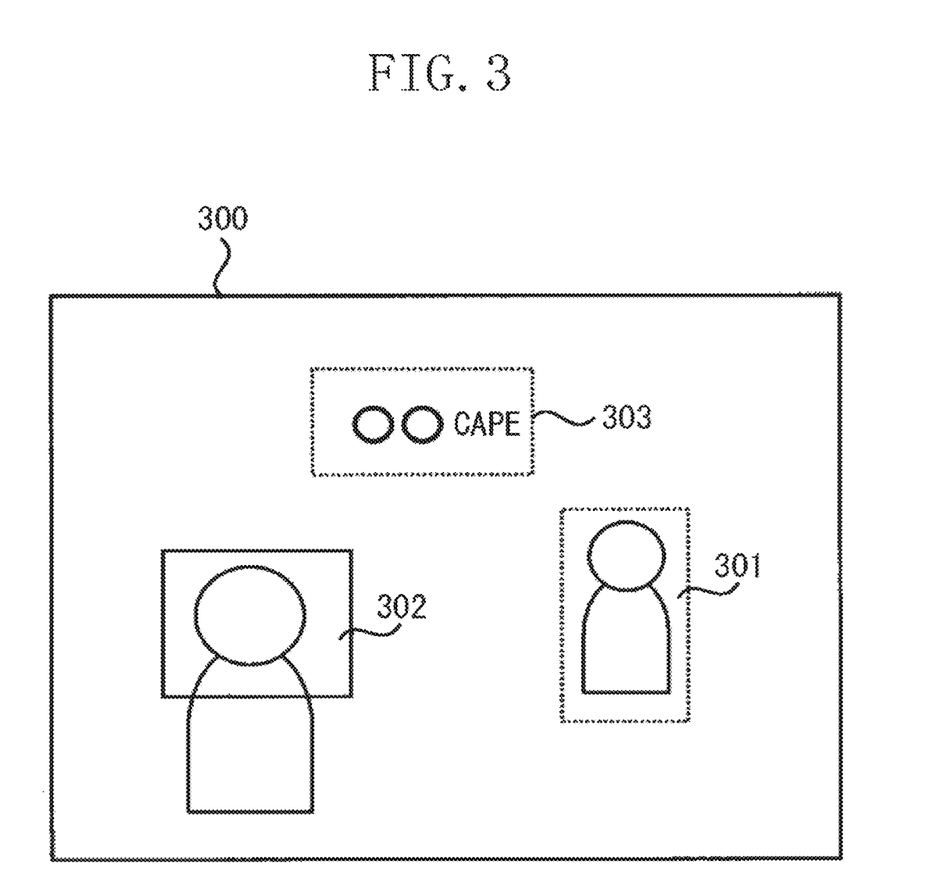
FIG. 3 illustrates an example of a feature amount of an image.

In this case, the feature amount is stored with any format that is expressed by a program language, such as a structure expression. Examples of the feature amount of the image may include a feature amount of figure (person) detection 301 in a finder image 300, a feature amount of face detection 302, and a feature amount of character detection 303, as illustrated in FIG. 3. Further, examples of the feature amount of the image may include a feature amount of face recognition, a feature amount of figure (person) recognition, a feature amount of an object, and a feature amount of a scene.

Next to step S504, or when it is determined that the acquired finder-image data cannot be analyzed in step S503 (NO in step S503), the CPU 105 determines whether the metadata can be generated in step S505.

In the present exemplary embodiment, when the still image is captured, the CPU 105 determines that the metadata can be generated (YES in step S505) and proceeds to step S507. Meanwhile, when the still image is not captured, the CPU 105 determines that the metadata cannot be generated (NO in step S505) and returns to step S502. The processes of steps S502 to S505 are executed for each frame.

Capturing of the still image is performed by pressing a release button included in the operation device 114 of the camera 100. The CPU 105 detects the operation as a release event. When the release event is detected, then in step S509, the CPU 105 executes an imaging process of the still image.

Next, similar to the process in step S504, in step S510, the CPU 105 extracts a feature amount of the still image and stores the extracted feature amount in the RAM 107. At this time, since the still image has a large image size, it is desirable that an appropriate process be executed as necessary.

As described above, the CPU 105 determines that the metadata can be generated (YES in step S505), when the still image is captured. The CPU 105 determines that the metadata cannot be generated (NO in step S505), when the still image is not captured.

In step S507, the CPU 105, serving as a metadata generation unit, generate the metadata, based on the feature amount extracted in step S504, and stores the metadata in the RAM 107.

Examples of the metadata may include face detection information, face recognition information, figure (person) recognition information, object information, character information, and scene information. At this time, the metadata may be generated together, based on the feature amount extracted in step S510. However, the types of the metadata are not limited to the examples.

In step S508, the CPU 105, serving as a metadata providing unit, provides the metadata generated in step S507 to the still image data acquired by the processes of steps S509 and S510. The CPU 105 stores the still image data in the external memory 112. Next, the CPU 105 erases information of the metadata stored in the RAM 107 by a series of processes and returns to step S501.

Figure 4:
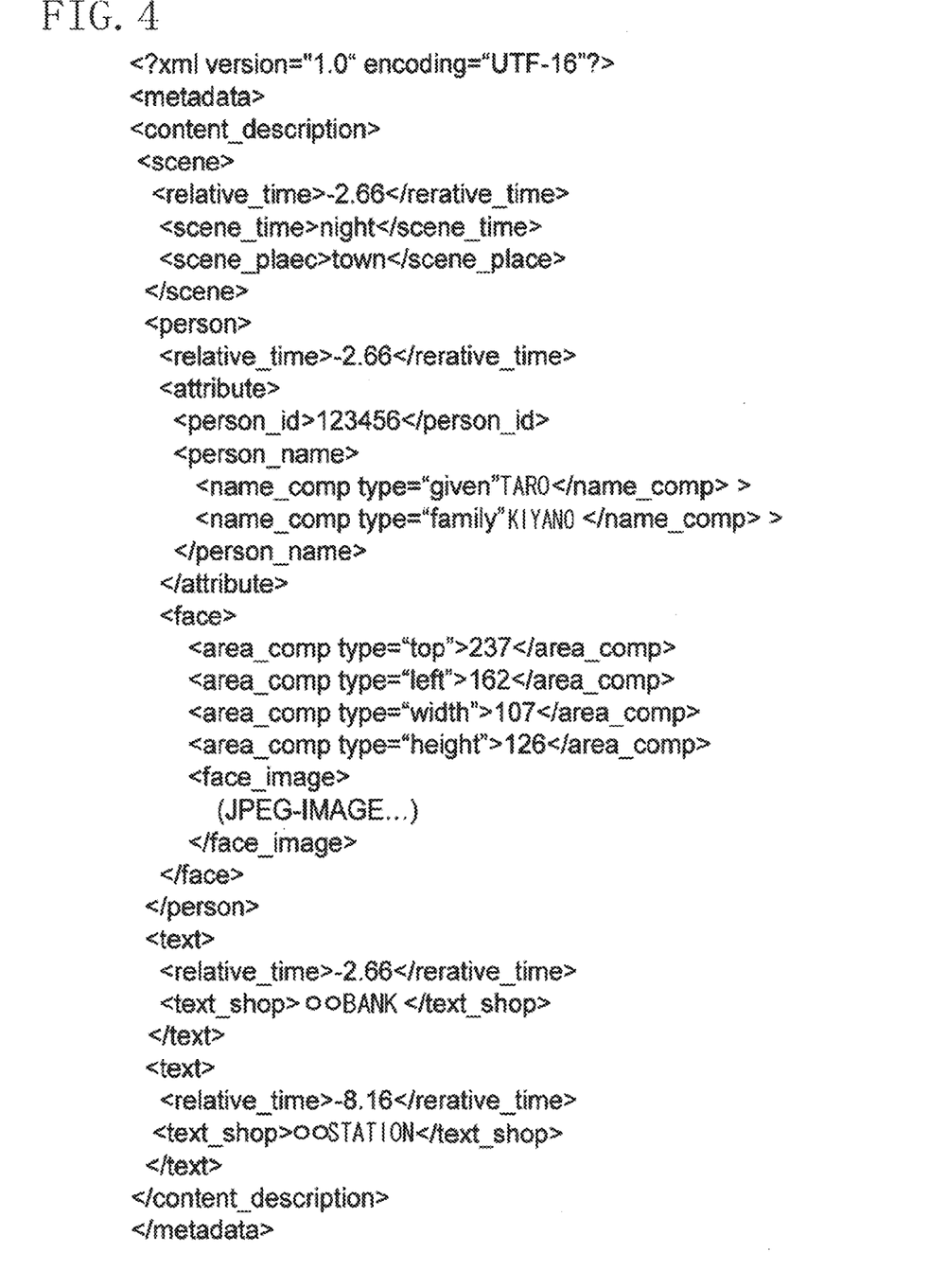
FIG. 4 illustrates a description example of metadata with an extensible markup language (XML) format.

Here, a description example of the metadata will be described. FIG. 4 illustrates a description example of metadata with an XML format. In the example illustrated in FIG. 4, a list of the metadata that is generated from the finder-image data immediately before the still image is captured is described.

For example, a relative detection time, a person ID, a person name, a face detection area, and a face thumbnail image (person-face image information) are described as person recognition information using a <person> tab. Further, person (figure) attribute information that indicates a person (figure) attribute may be described.

The relative detection time represents a captured time of the finder-image data from which the metadata is extracted measured from the captured time of the still image. To calculate a person ID and a person name, the collation with a previously registered face image database may be performed using a well-known face image determining processing.

A face detection position is represented by still image coordinates. This is effective when deviation between the finder image and the captured still image is within a predetermined range in the line-of-sight direction, which includes a case where the line-of-sight direction is identical therebetween.

In this case, it is possible to determine whether the deviation is within the predetermined range using the position/posture detection unit 108 and the image processing unit 102. When the deviation is within the predetermined range, the CPU 105 converts the coordinate information in the finder image into coordinate information of the captured still image and generates metadata.

Further, the face thumbnail information is information to which a face image is added as a thumbnail image, and is represented as a <face_image> tag. The thumbnail image is cut from the corresponding finder image to be added thereto.

An example of the thumbnail image is not limited to a face image. When character information is detected, an entire object area including the corresponding character information is cut out and added to the thumbnail information.

Examples of an object including the character information may include a seal, a license plate, an advertising display or neon lighting.

Another metadata includes scene information described by a <scene> tag. Examples of the scenes may include a background or a place, such as an indoor scene, outdoor scene, landscape, sea, mountain, and street. In addition, examples of the scenes include a season such as a spring, summer, autumn, and winter. Further, examples of the scenes further include an event, such as an entrance ceremony, graduation ceremony, sports festival, school trip, and wedding ceremony. The information may be extracted using a well-known technique.

Another metadata includes character information described by a <text> tab. Even in this case, similar to the face information, a relative detection time is described. The character information is obtained by extracting a character existing in an image by a character recognizing process. Further, images of the face area and the character area may be provided as metadata.

Further, the metadata generated from the still image can be represented by the similar method to the above method. However, a relative detection time of the metadata generated from the still image becomes zero.

Further, examples of a description format of the metadata may include a format that is used to add the metadata to a header of an image, in addition to the XML format. For example, Exif2.1 that is described in a header of a joint photographic experts group (JPEG) image corresponds to the description format. In this case, the metadata is described according to an Exif format. Further, in step S508, the metadata is provided to an image header of the still image data.

Figure 5:
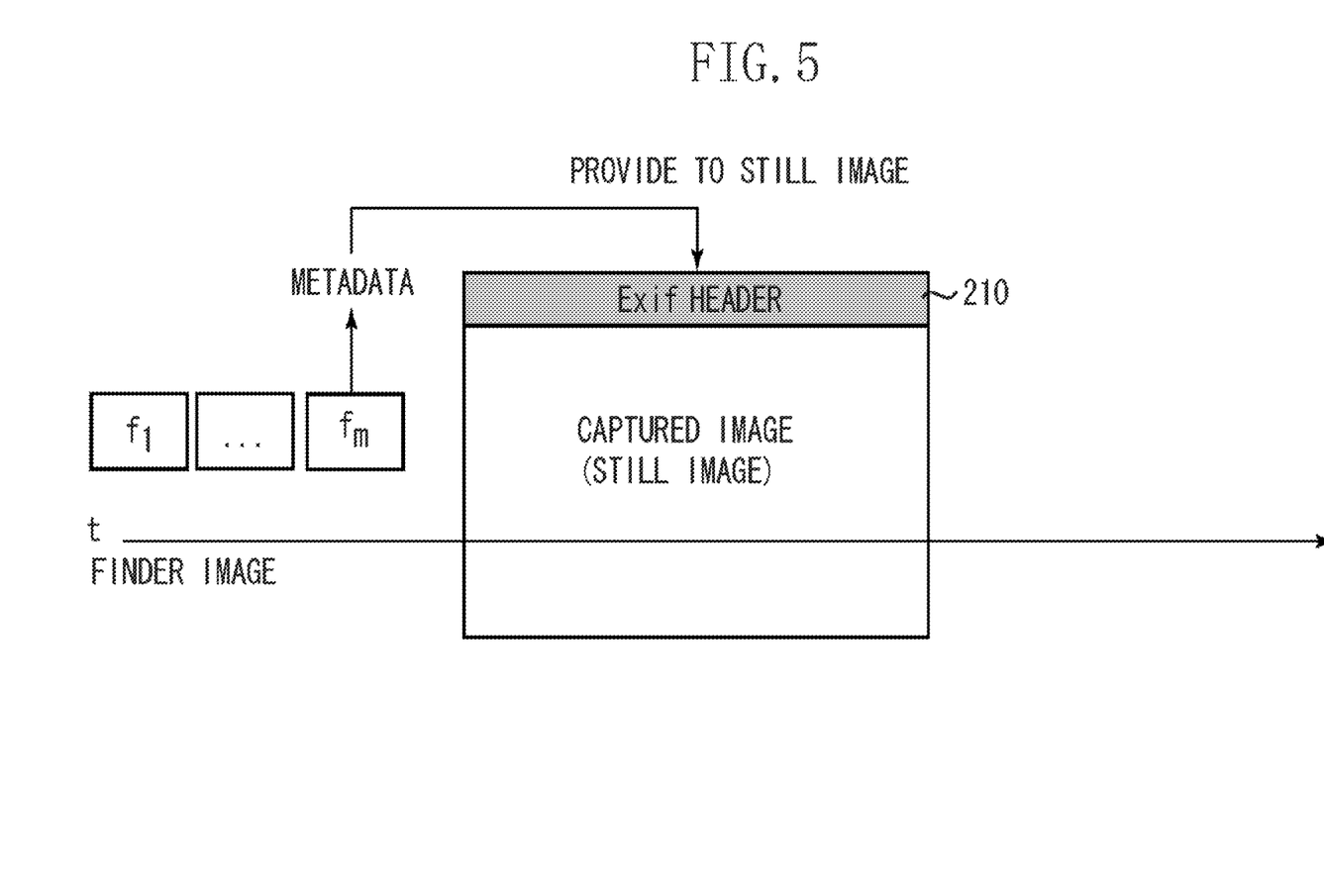
FIG. 5 illustrates images acquired by a camera according to the first exemplary embodiment and arranged along a time axis.

According to the present exemplary embodiment, processing illustrated in FIG. 5 is executed, and the still image data, to which the metadata generated from the finder-image data before capturing the still image is provided, is obtained. FIG. 5 illustrates images acquired by a camera 100 are arranged along a time axis.

As described above, in the present exemplary embodiment, if the mode is set to the still image capturing mode even before capturing the still image 210, the CPU 105 sequentially acquires finder-image data $f_1, \ldots,$ and $f_m$ for each frame, by executing processes in steps S502 to S505.

In this case, whenever new finder-image data is acquired, the CPU 105 erases the previously acquired finder-image data through overwriting. In step S504, the CPU 105 extracts a feature amount before the previously acquired finder-image data is erased through overwriting.

Further, capturing ranges of the finder image and the still image are the same. However, as described above, the finder image has resolution lower than that of the still image. Further, the finder image and the still image cannot be simultaneously acquired.

However, if the finder image has resolution of about QVGA (320×200 pixels) and has no effect of the camera shaking and the blurring, a face can be detected and determined by an image analysis. Further, recognition of the captured character is also possible.

In addition, when the still image 210 is captured, by processes of steps S505 to S508, the CPU 105 provides the metadata, which is extracted and generated from the finder-image data $f_1$ to $f_m$, to data of the still image 210.

At this time, the CPU 105 also generates metadata based on the feature amount extracted from the still image 210 in step S510, merges the metadata with the metadata generated from the finder-image data $f_1$ to $f_m$ and provides the merged metadata to a header of the data of the still image 210.

At this time, the CPU 105 also provides an imaging date and time, an imaging parameter, and image direction information acquired from the position/posture detection unit 108 as basic information. Then, the CPU 105 stores the data in the external memory 112.

The format for providing the metadata to the header of the JPEG image is defined, for example, by Exif2.1. However, the format of the metadata used for this invention is not limited to a specific format.

The metadata provided to the still image data as described above is used for display and search on an image browser. For example, there is a content directory service (CDS) of a universal plug and play (UPnP) as one of communication standards used in a digital living network alliance (DLNA) that is a standard used for network home appliances. If a camera has the CDS function, a browser can perform various searches through the network. Further, if the CDS function is used at the time of imaging, it is possible to purposely generate, as metadata, surrounding circumstances and subject information that the user desires to add to a captured still image, in addition to the subject image.

Thus, according to the present exemplary embodiment, since the metadata is generated from the finder-image data before the still image is captured and is added to the still image data, metadata having deep relationship with respect to the still image can be obtained. That is, it is possible to provide the metadata that is not included in the captured still image to the captured image.

For example, it is possible to provide, as metadata, character information of an advertising display around an imaging spot and information of a person staying together at the imaging spot around the imaging time. Therefore, a wide range of metadata can be provided. As a result, when the still image is viewed, various displays and searches can be performed, and convenience for viewing the still image can be improved.

Further, in step S503, with respect to the finder-image data that is determined to be unanalyzable due to camera shaking or blurring (NO in step S503), the extraction of the feature amount is omitted. Accordingly, the load on the CPU 105 can be reduced and processing efficiency can be improved.

Whether the blurring exists or not can be determined from a state of an automatic focus (AF) processing of which the imaging control unit 103 performs a control operation. Further, whether camera shake exists or not can be determined from the detection result from the position/posture detection unit 108, which detects the vibration of the imaging unit 101 as the vibration detection unit. Further, positional information can be detected from the position/posture detection unit 108.

Accordingly, position detection may always be performed even wile the finder display is performed, and the feature amount that is extracted from the finder-image data captured at a spot that is far by a predetermined distance from the imaging spot of the still image may not be used for generating the metadata.

Further, even though the metadata is generated based on the corresponding feature amount, it may be configured not to provide the corresponding metadata to the still image data. If the process is executed as described above, an image analyzing process can be omitted when the finder image is defective and thus metadata can be efficiently generated.

When the metadata is generated using feature amounts of a plurality of finder-image data, the possibility of the same or similar metadata being generated is high. Accordingly, it is preferable that a predetermined standard may be set for generating the metadata and the information amount (e.g., number) of the metadata may be restricted.

For example, with respect to the feature amount that is easily verified to be the same character, the same metadata may be erased. Further, with respect to the face detection and the face determination, a reliability degree may be derived, and the metadata may be erased, except for the metadata that is generated using the feature amount whose reliability degree is higher than the predetermined reference value. The reliability degree represents a face likeness (possibility to be a face), and is a parameter that can be acquired during a plurality of face detecting processes.

Further, the metadata may be erased, except for the metadata that is generated using the feature amount of the finder-image data whose time interval with the captured image of the still image is short. In these cases, the CPU 105 functions as a restriction setting unit to set a limit to the information amount of the metadata. Further, the CPU 105 functions as a deriving unit to extract a reliability degree of character information and figure (person) information, and provides the metadata to the image data in the descending order of reliability degree up to the set limit amount.

By performing processing as described above, the metadata can be efficiently generated by excluding the overlapped metadata and using only information having the high reliability degree.

Next, a second exemplary embodiment will be described below. In the second exemplary embodiment, the metadata is generated from the finder-image data after imaging the still image in addition to the metadata generated from the finder-image data before capturing the still image, and the metadata is provided to the still image data. Other configuration is similar to the configuration of the first exemplary embodiment. Hereinafter, a difference between the first exemplary embodiment and the second exemplary embodiment is mainly described.

In the second exemplary embodiment, the CPU 105 generates metadata from finder-image data that is acquired before and after imaging a still image. At this time, the CPU 105 specifies finder-image data to be a target of metadata generation according to any one of the following three rules.

This is to clearly determine a still image to which the metadata is provided by setting a determination reference, because the finder-image data of a still image after imaging is also the finder-image data of the subsequently captured still image before imaging.

The first determination standard is to adopt the metadata, which is generated from the finder image acquired between the two still images, as the metadata for both of the still images. The metadata is provided to the two still image data.

The second determination standard is to adopt the metadata generated from a finder image, which is acquired within a predetermined time (for example, within Δt seconds) before and after the photographic time of the still image, as the metadata of a still image.

In the third determination standard, the captured time of the previous still image may be set as t1 and the photographic time of the following still image may be set as t2, and the time t1+Δtm is determined between the times above. The metadata that is generated from the finder images acquired between the time t1 and the time t1+Δtm is adopted as the metadata of the former still image. Further, the metadata that is generated from the finder images acquired between the time t1+Δtm and the time t2+Δtm is adopted as the metadata of the latter still image.

Then, similarly to the first exemplary embodiment, the same processes as the processes illustrated in the flowchart in FIG. 2 are executed. However, in step S507, in the first exemplary embodiment, whether the still image is captured or not is determined. However, in the second exemplary embodiment, it is determined whether the metadata can be generated, using any one of the three types of determination standards.

Figure 6:
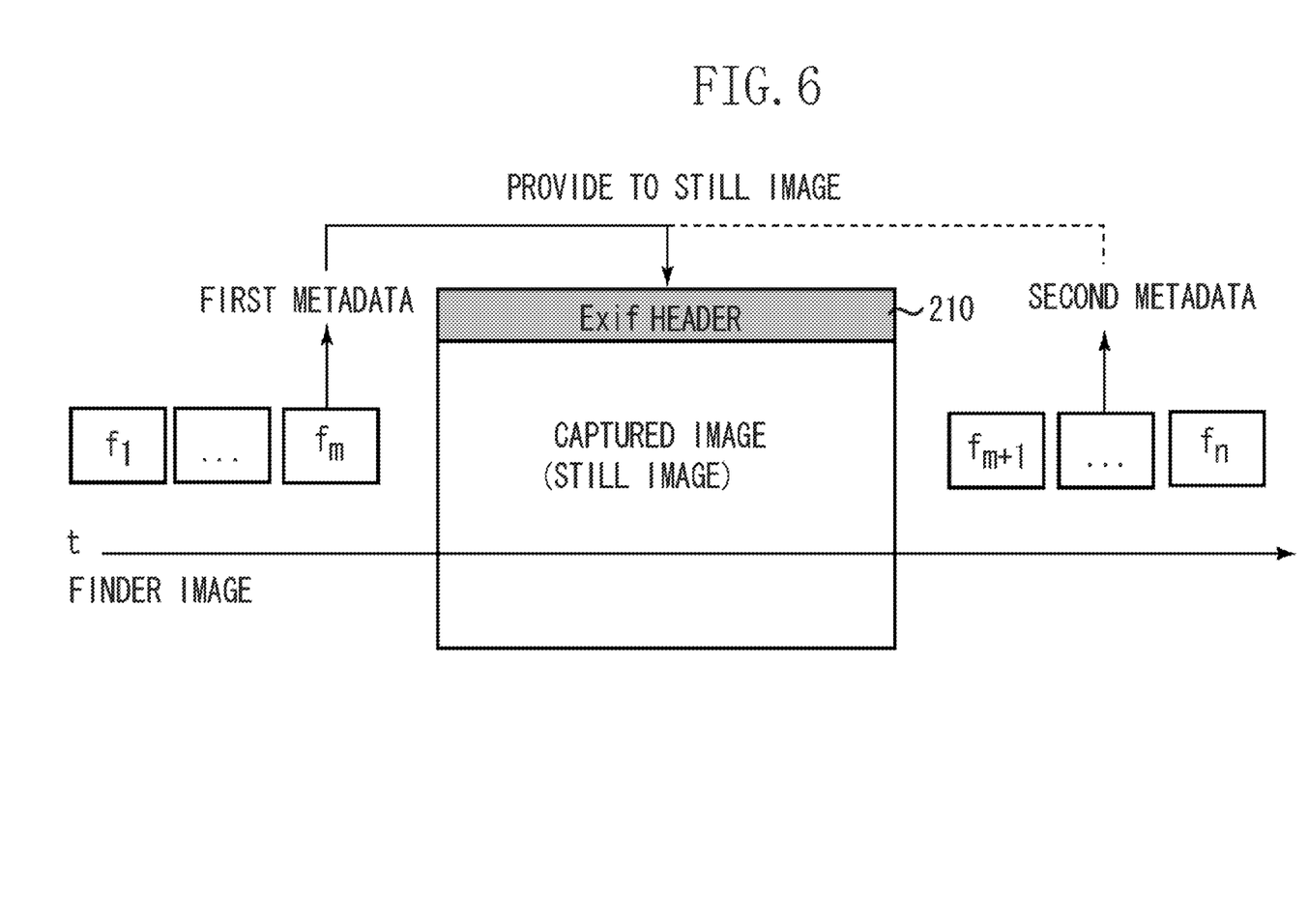
FIG. 6 illustrates images acquired by a camera according to a second exemplary embodiment and arranged along a time axis.

As the result of the processing based on the above rules, as illustrated in FIG. 6, in addition to the first metadata generated from the finder-image data $f_1$ to $f_m$ before imaging of the still image 210, the second metadata generated from the finder-image data $f_{m+1}$ to $f_n$ after imaging is also provided to the data of the still image 210.

According to the second exemplary embodiment, even after the still image is captured, a user of a camera can take an object that the user desires to provide as the metadata and add the metadata to the captured still image. As a result, convenience in metadata providing work can be further improved.

Figure 7:
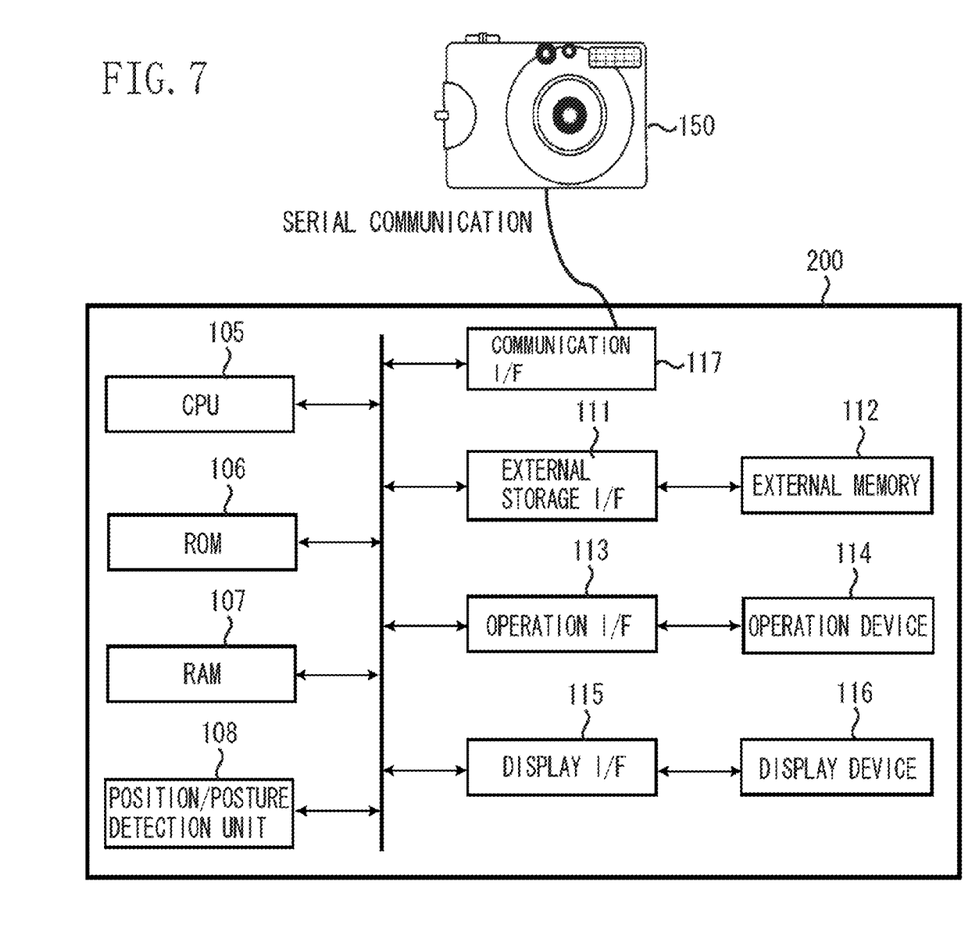
FIG. 7 illustrates a camera adapter according to a third exemplary embodiment of the present invention.

Next, a third exemplary embodiment will be described. In a camera system according to the third exemplary embodiment, a camera is controlled by a camera adapter connected to the camera, not by a camera body, and the camera adapter executes a metadata providing processing. In other word, in the third exemplary embodiment, the camera adapter functions as an image processing apparatus. FIG. 7 illustrates a camera adapter according to the third exemplary embodiment of the present invention.

A camera adapter 200 according to the third exemplary embodiment includes a CPU 105, a ROM 106, a RAM 107, a position/posture detection unit 108, an external storage I/F 111, an operation device I/F 113, and a display device I/F 115, similarly to the camera 100. The camera adapter 200 further includes a communication I/F 117.

The ROM 106 stores a program executed by the CPU 105. This program includes a program that is used to provide metadata to still image data.

The camera adapter 200 is a small computer that has a network communication function, and is connected to an external camera (imaging apparatus) 150 using a serial connection, such as a USB. The camera 150 connected to the camera adapter 200 operates in a PC linkage mode. Further, the camera 150 includes an imaging unit, an image processing unit, an imaging control unit, a ROM, a RAM, and a CPU (not illustrated), similarly to the camera 100.

In the camera system that has the above configuration, the camera 150 is controlled by the camera adapter 200. That is, by the CPU 105 of the camera adapter 200 mainly executing the program that is stored in the ROM 106, the operation of the camera 150 is controlled.

For example, requests for a start and a completion of a still image capturing mode and a transmission of image data to the camera adapter 200 are made from the camera adapter 200 to the camera 150.

Figure 8:
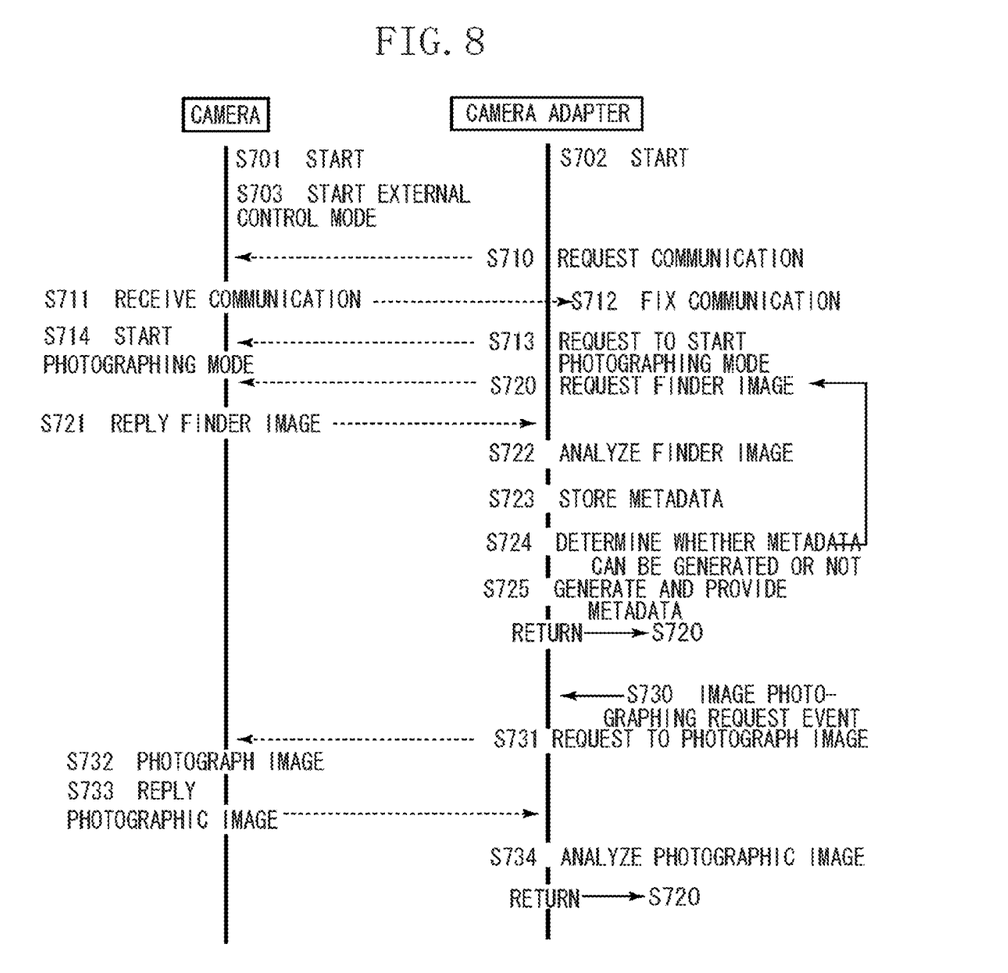
FIG. 8 illustrates an operation sequence of a camera and a camera adapter according to the third exemplary embodiment.

Next, the operation of the camera system will be described. FIG. 8 illustrates an operation sequence of the camera 150 and the camera adapter 200 according to the third exemplary embodiment.

First, the CPU 105 starts in step S701 and the camera adapter 200 starts in step S702.

Next, in step S703, an operation mode of the camera 150 is set to a mode in which external control is possible, for example, a PC linkage mode.

Next, in step S710, the camera adapter 200 requests the camera 150 for communication. In step S711, if the camera 150 accepts the communication request, communication is established in step S712.

In step S713, the camera adapter 200 requests the camera 150 for starting an imaging mode. Then, in step S714, the camera 150 starts the imaging mode.

Next, the camera adapter 200 requests for a finder image in step S720. Meanwhile, the camera 150 acquires the finder-image data, and transmits the finder-image data to the camera adapter 200, in step S721.

Next, in step S722, the camera adapter 200 extracts a feature amount of an image to generate metadata from the finder-image data. In step S723, the camera adapter 200 stores the feature amount of the image in the RAM 107.

Next, the camera adapter 200 determines whether the metadata can be generated, in step S724. In the determination, similar to the determination of step S505 in the first and second exemplary embodiments, timing when the metadata is generated and whether a process of providing the metadata to the still image data is possible are determined.

In addition, when it is determined that the metadata cannot be generated, the camera adapter 200 returns to step S720 and continues the process. Meanwhile, when it is determined that the metadata can be generated, the camera adapter 200 generates the metadata and provides the metadata to the still image data, in step S725. Then, the camera adapter 200 returns to step S720 and continues the process.

In the present exemplary embodiment, since the camera adapter 200 executes the series of processes, useful metadata can be generated and provided, even when an advanced process function is not incorporated in the camera 150, for example, when the programs illustrated in the first and second exemplary embodiments are not included.

The still image is captured when an imaging event is generated in step S730. That is, if an imaging request event is generated, the camera adapter 200 requests the camera 150 for capturing an image, in step S731.

Meanwhile, the camera 150 captures the still image in step S732. In step S733, the camera 150 transmits the image data of the still image to the camera adapter 200.

Next, in step S734, the camera adapter 200 executes an image analyzing process on the still image data, and stores necessary information as metadata. Then, the process returns to step S720 and the process is continued. Further, a completion process is not illustrated in the sequence diagram of FIG. 8.

In the third exemplary embodiment, the camera 150 and the camera adapter 200 are separated from each other. For this reason, if the camera adapter 200 includes a predetermined function, useful metadata can be provided, even when the camera 150 does not include an advanced image processing function and an advanced image analyzing function. Further, the same camera adapter 200 can be used with respect to the plurality of cameras 150. Further, if the camera adapter 200 is portable, the camera adapter 200 can be easily carried.

The present invention is not limited to the imaging of the still image. The present invention may be applied to an imaging apparatus such as a digital camera and a digital video camera, which can capture a moving picture.

In this case, when the camera is switched to a recording start mode, the camera becomes a recording waiting (recording stop) state. Then, the finder image becomes effective. When a recording start button is pressed, recording of a moving picture starts.

When the present invention is applied to the imaging apparatus that can capture the moving picture, the similar processes to those in the exemplary embodiments described above may be executed using the finder image in the recording waiting state. As a result, the metadata that is generated from the finder image can be provided to the following captured moving picture.

Further, the present invention is realized by reading out a program code of software realizing the functions of the exemplary embodiments from a computer readable storage medium and executing the program code, by the CPU. In addition, the present invention can be realized by executing a portion or all of the processes by an operating system (OS), based on an instruction from the read program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-167893 filed Jun. 26, 2008, which is hereby incorporated by reference herein in its entirety.

What is claimed is:

1. An image processing apparatus, comprising:
a confirming-image data acquiring unit configured to acquire image data to be used for confirming an image to be captured from an imaging unit;
an image analysis unit configured to analyze the confirming-image data;
a metadata generation unit configured to generate metadata based on the analysis result by the image analysis unit;
a restriction setting unit configured to set a limit to the amount of information of the metadata;
a deriving unit that derives a reliability degree of the analysis result by the image analysis unit; and
a metadata providing unit configured to provide the metadata to the data of the image captured by the imaging unit in a descending order of reliability degree within the limit set by the restriction setting unit.

2. The image processing apparatus according to claim 1, wherein the imaging unit is included in the image processing apparatus.

3. The image processing apparatus according to claim 1, further comprising a communication unit configured to communicate with an imaging apparatus that includes the imaging unit.

4. The image processing apparatus according to claim 1, wherein the metadata generation unit generates the metadata, based on the analysis result by the image analysis unit with respect to the data acquired by the confirming-image data acquiring unit at least before or after the imaging is made by the imaging unit.

5. The image processing apparatus according to claim 1, wherein the metadata generation unit generates the metadata, based on the analysis result by the image analysis unit with respect to the data acquired by the confirming-image data acquiring unit within a predetermined time since the imaging is made by the imaging unit.

6. The image processing apparatus according to claim 1, further comprising a vibration detection unit configured to detect a vibration of the imaging unit,
wherein the image analysis unit omits the analysis, when the vibration detecting unit detects a vibration of the imaging unit.

7. The image processing apparatus according to claim 1, further comprising a focus control unit configured to control a focus of the imaging unit,
wherein the image analysis unit omits the analysis, when the focus control unit is controlling the focus.

8. The image processing apparatus according to claim 1, wherein the metadata generation unit generates, as the metadata, data related to a background included in the image.

9. The image processing apparatus according to claim 1,
wherein the metadata generation unit generates, as the metadata, data related to a character included in the image.

10. The image processing apparatus according to claim 1,
wherein the metadata generation unit generates, as the metadata, data related to a person included in the image.

11. The image processing apparatus according to claim 10,
wherein the metadata generation unit generates at least any one of information selected from a group including person determination information, face image information, and person attribute information, as the data related to the person.

12. An image processing apparatus, comprising:
a confirming-image data acquiring unit configured to acquire image data to be used for confirming an image to be captured from an imaging unit;
an image analysis unit configured to analyze the confirming-image data;
a metadata generation unit configured to generate metadata based on the analysis result by the image analysis unit;
wherein, in the case in which a deviation of a position and a posture of the imaging unit between when the confirming-image data acquiring unit acquires the image data and when the imaging is made by the imaging unit is within a predetermined range, the metadata generation unit converts coordinate information of the confirming-image into coordinate information of the image captured by the imaging unit and generates the metadata; and
a metadata providing unit configured to provide the metadata to the data of the image captured by the imaging unit.

13. The image processing apparatus according to claim 1,
wherein the image analysis unit analyses the data of the image captured by the imaging unit, and the metadata generation unit generates the metadata, based on the analysis result with respect to the data of the image captured by the imaging unit.

14. An information processing method, comprising:
acquiring confirming-image data in an imaging unit;
analyzing the confirming-image data;
generating metadata based on the analysis result;
setting a limit to the amount of information of the metadata;
deriving a reliability degree of the analysis result; and
providing the metadata to the image data captured by the imaging unit in a descending order of reliability degree within the limit set.

15. A non-transitory computer-readable storage medium that stores a program for instructing a computer to implement an information processing method, the method comprising:
acquiring confirming-image data in an imaging unit;
analyzing the confirming-image data;
generating metadata based on the analysis result;
setting a limit to the amount of information of the metadata;
deriving a reliability degree of the analysis result; and
providing the metadata to the image data captured by the imaging unit in a descending order of reliability degree within the limit set.

* * * * *